US 12,455,083 B2

(12) United States Patent
Tanaka et al.

(10) Patent No.: US 12,455,083 B2
(45) Date of Patent: Oct. 28, 2025

(54) FACILITY AND IMPLEMENTATION METHOD FOR MANUFACTURING OF ARTICLE USING SAID FACILITY

(71) Applicant: CUORIPS INC., Tokyo (JP)

(72) Inventors: Masanori Tanaka, Minoh (JP); Noriko Umeda, Minoh (JP); Naoko Terao, Minoh (JP); Atsuko Wakimura, Minoh (JP); Tsuyoshi Ishikawa, Minoh (JP); Nobu Miyakawa, Minoh (JP)

(73) Assignee: CUORIPS INC., Tokyo (JP)

( * ) Notice: Subject to any disclaimer, the term of this patent is extended or adjusted under 35 U.S.C. 154(b) by 683 days.

(21) Appl. No.: 17/785,245

(22) PCT Filed: Dec. 10, 2020

(86) PCT No.: PCT/JP2020/046041
§ 371 (c)(1),
(2) Date: Jun. 14, 2022

(87) PCT Pub. No.: WO2021/125042
PCT Pub. Date: Jun. 24, 2021

(65) Prior Publication Data
US 2023/0032285 A1 Feb. 2, 2023

(30) Foreign Application Priority Data
Dec. 16, 2019 (JP) .................. 2019-226426

(51) Int. Cl.
*F24F 3/167* (2021.01)
*F24F 11/00* (2018.01)
(52) U.S. Cl.
CPC ....... *F24F 3/167* (2021.01); *F24F 2011/0004* (2013.01)
(58) Field of Classification Search
CPC ........................ F24F 3/167; F24F 2011/0004
(Continued)

(56) References Cited

U.S. PATENT DOCUMENTS 5,344,069 A * 9/1994 Narikiyo .................. F24F 11/75
165/215
8,584,349 B2 * 11/2013 Scannon ................. B23P 25/00
52/234
(Continued)

FOREIGN PATENT DOCUMENTS

JP 2002195620 A 7/2002
JP 2006094754 A 4/2006
(Continued)

OTHER PUBLICATIONS

International Search Report dated Jan. 26, 2021 for International Application No. PCT/JP2020/046041, 4 pages with English translation.
(Continued)

*Primary Examiner* — Avinash A Savani
*Assistant Examiner* — Dana K Tighe
(74) *Attorney, Agent, or Firm* — MH2 Technology Law Group, LLP

(57) ABSTRACT

The present invention provides a facility capable of efficiently performing work while maintaining the cleanliness of a location where an article is manufactured, when manufacturing of the article and other work are performed in parallel concurrently; and an implementation method for manufacturing an article by using the facility. The facility comprises a clean room 1, multiple work booths 2 provided inside the clean room 1 and each comprising an entrance and exit, and barrier sections provided along entrances and exits of the multiple work booth 2 and configured to prevent airflow from the outside to the inside through the entrances and exits. The area inside each of the multiple work booths 2 has the same grade of cleanliness as the area that is outside the multiple work booths 2 but is inside the clean room 1.

10 Claims, 5 Drawing Sheets

(58) Field of Classification Search
USPC .......................................................... 454/187
See application file for complete search history.

(56) References Cited

U.S. PATENT DOCUMENTS

| | | | |
|---|---|---|---|
| 11,649,975 B2* | 5/2023 | Sekizawa | F24F 7/007 |
| | | | 62/186 |
| 2002/0068524 A1 | 6/2002 | Nakagawa | |
| 2016/0010883 A1* | 1/2016 | Jornitz | F24F 3/167 |
| | | | 29/897.3 |

FOREIGN PATENT DOCUMENTS

| | | |
|---|---|---|
| JP | 2008248565 A | 10/2008 |
| JP | 2012513649 A | 6/2012 |
| JP | 2018505669 A | 3/2018 |
| JP | 2019095152 A | 6/2019 |
| JP | 2019100594 A | 6/2019 |
| WO | 2010075389 A2 | 7/2010 |
| WO | 2016116507 A1 | 7/2016 |

OTHER PUBLICATIONS

Extended European Search Report mailed in EP 20903566.6 on Jan. 16, 2024. (5 pages).
Chinese Office Action with English language translation mailed in CN 202080087161.2 on Mar. 29, 2024. (13 pages).

* cited by examiner

Fig. 5

| Work booths | Step 1 Step 2 About 4 to 7 weeks | Step 3 About 2 weeks | Step 4 About 2 weeks | Step 5 1 day | Step 6 In principle, 6 months or less |
|---|---|---|---|---|---|
| 1-1 | | | | | PST |
| 1-2 | PST | | | | |
| 2-1 | PST | | | | |
| 2-2 | | | | | |
| 3-1 | PST | | | | |
| 3-2 | | | | | |
| 3-3 | | | | | |
| 3-4 | | | PST | | |

FACILITY AND IMPLEMENTATION METHOD FOR MANUFACTURING OF ARTICLE USING SAID FACILITY

CROSS-REFERENCE TO RELATED APPLICATIONS

This application is a U.S. National Stage application of International Application No. PCT/JP2020/046041 filed 10 Dec. 2020, which claims priority to Japanese Application No. 2019-226426 filed 16 Dec. 2019, the entire disclosures of which are hereby incorporated by reference in their entireties.

TECHNICAL FIELD

The present invention relates to a facility and an implementation method for manufacturing an article by using the facility.

BACKGROUND ART

The process simulation test has been heretofore conducted before starting to manufacture an article (see, for example, Patent Literature (PTL) 1). The process simulation test is a test to verify whether production steps and the production method for manufacturing an article, such as a cellular and tissue-based product or a pharmaceutical product, are appropriate for manufacturing the article. The process simulation test is performed by using the same conditions as actual manufacturing conditions in terms of, for example, production procedures, facilities, materials, and manufacturing environments, to confirm, for example, that sterility expected for the product is ensured.

Therefore, the process simulation test must be repeatedly performed through all steps or for each step while taking into account variable factors, such as personnel and facilities, used in the actual production steps for manufacturing an article.

CITATION LIST

Patent Literature

PTL 1: JP2018-505669A

SUMMARY OF INVENTION

Technical Problem

If the process simulation test is performed in a clean room before manufacturing an article, actual production cannot be started in the same clean room during the process simulation test, which is inefficient. Further, in producing multiple products, when a process for producing one product is performed, processes for producing the other products cannot be concurrently performed in parallel with the process for producing the product, which is also inefficient.

Accordingly, multiple clean rooms are used to concurrently perform the process simulation test and a product production in parallel or to concurrently perform processes for producing multiple products in parallel.

However, when multiple clean rooms are used, the possibility of contamination inside the clean rooms increases as people enter or exit a clean room or move between multiple clean rooms. Contamination inside a clean room occurs, for example, due to inflow of floating particulates and/or microorganisms that are present in an area of low cleanliness into the clean room when people move between clean rooms through the area of low cleanliness.

Furthermore, when workers move from outside the clean room (e.g., a passage) to inside the clean room, the level of cleanliness differs between the outside and the inside of the clean room. Therefore, the workers must change their clothes according to the level of cleanliness each time, which is inefficient.

The present invention has been made in view of the above circumstances. An object of the present invention is to provide a facility that can efficiently perform work while maintaining the cleanliness of a location where an article is manufactured, when the work of manufacturing the article and other work are concurrently performed in parallel. Another object of the present invention is to provide an implementation method for manufacturing an article by using the facility.

Solution to Problem

The facility according to an aspect of the present invention comprises a clean room, multiple work booths provided inside the clean room and each comprising an entrance and exit, and barrier sections provided along entrances and exits of the multiple work booths and configured to prevent airflow from the outside to the inside through the entrance and exit of each work booth. The area inside each of the multiple work booths has the same grade of cleanliness as the area that is outside the multiple work booths but is inside the clean room.

The implementation method for manufacturing an article according to an aspect of the present invention is a method for manufacturing an article by using the above facility. At least one of the multiple work booths is used to manufacture an article, whereas other work booth among the multiple work booths, which is different from the work booth where the article is manufactured, is used to perform other work that is different from manufacturing the article.

Advantageous Effects of Invention

The facility and the implementation method for manufacturing an article by using the facility according to the above aspect of the present invention are advantageous in that when the manufacture of an article and other work are concurrently performed in parallel, the work can be efficiently performed while maintaining the cleanliness of a location where the article is manufactured.

BRIEF DESCRIPTION OF DRAWINGS

FIG. 5 is a process chart for implementing the manufacture of an article according to the embodiment of the present invention.

DESCRIPTION OF EMBODIMENTS

(1) Embodiment

(1.1) Overview

The implementation method for manufacturing an article according to this embodiment of the present invention is explained below.

Figure 1:
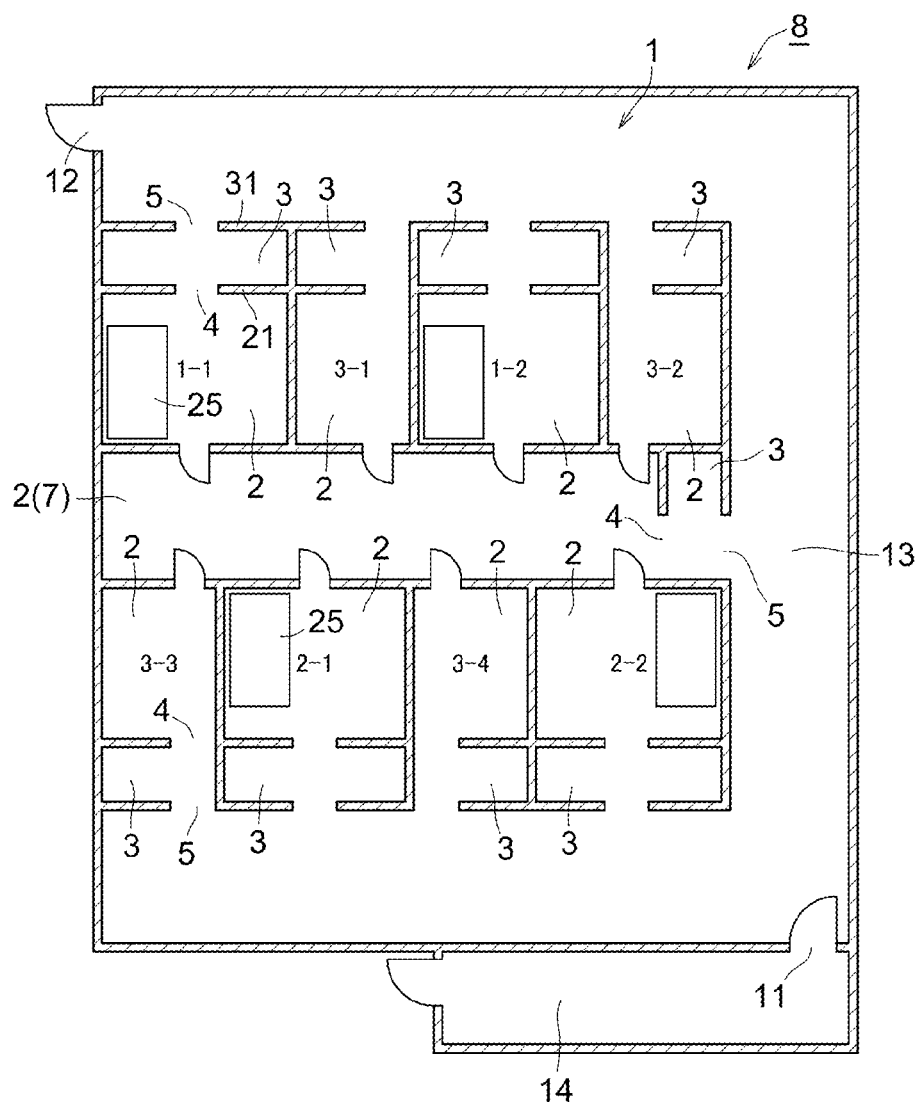
FIG. 1 is a sketch of a facility according to an exemplary embodiment of the present invention.

As shown in FIG. 1, the implementation method for manufacturing an article (which may be referred to below as the "manufacturing implementation method") is performed by using a facility 8 comprising at least a clean room 1 and multiple work booths 2 provided in the clean room 1.

The article manufactured by the manufacturing implementation method according to this embodiment includes cellular and tissue-based products manufactured in a work booth 2 that is maintained at a high level of cleanliness. "Cellular and tissue-based products" as referred to herein means (1) products obtained by culturing or otherwise processing human or animal cells and used to (a) reconstruct, repair, or form the body structure or functions or to (b) treat or prevent diseases; or (2) products introduced into human cells and used for gene therapeutic purposes. The products (1) include processed cells and processed tissues. The products (2) include gene therapy products and gene therapy drugs.

Examples of human processed cells include products processed from human somatic cells, products processed from human somatic stem cells, products processed from human embryonic stem cells, products processed from human induced pluripotent cells, and the like.

Examples of animal processed cells include products processed from animal somatic cells, products processed from animal somatic stem cells, products processed from animal embryonic stem cells, products processed from animal induced pluripotent cells, and the like.

Examples of gene therapy products include plasmid vector products, virus vector products, other gene expression therapy products, and the like.

Examples of "cellular and tissue-based products" include myocardial regeneration products, cartilage regeneration products, skin regeneration products, cells used in cancer immunotherapy (e.g., dendritic cells, NK cells, T lymphocytes, etc.), genetic disease treatment products, and the like.

The article of the present invention is not limited to articles containing cellular and tissue-based products and may also include articles containing, for example, specific processed cells, pharmaceutical products, processed foods, or the like. Examples of pharmaceutical products include anticancer agents, hemophilia treatment drugs, bioengineered formulations, plasma fractionation drugs, vaccine formulations, companion diagnostic drugs, orphan drugs, and the like.

The ministerial ordinance or notification stipulates that when an article such as those described above is to be manufactured, the process simulation test must be performed an appropriate number of times (e.g., 3 times), such as before starting production. For example, in the field of cellular and tissue-based products, the Ministerial Ordinance on Good Practices for Manufacturing and Quality Management of Regenerative Medical Products (the Ministerial Ordinance on "Good Gene, Cell and Tissue Practice (GCTP)") etc. require that the process simulation test be performed before starting production.

Further, the process simulation test must be performed not only before starting production but also on a regular basis (for example, at least once every six months) for each production step, and must be performed by all workers involved in each production step. Therefore, when an article is to be manufactured, an extremely large number of process simulations must be performed.

The process simulation test is performed by using a microbial culture medium in place of cells and a liquid culture, a chemical liquid, and the like that are in direct contact with the cells, and carrying out production steps under the same conditions as actual production in terms of, for example, procedures, facilities, starting materials, raw materials, environment, and personnel for manufacturing an article to evaluate whether sterility in an aseptic processing step is appropriate.

In general, when the process simulation test is conducted, it is not possible to concurrently manufacture an article corresponding to the process simulation or manufacture another article in parallel with the process simulation test. This is because in conventional techniques, if one attempts to concurrently manufacture an article in parallel with process simulation, another clean room for manufacturing is necessary.

In contrast, the facility 8 according to this embodiment comprises a clean room 1, multiple work booths 2 provided in the clean room 1, and barrier sections provided along entrances and exits of the corresponding work booths 2. Each barrier section functions to prevent airflow from the outside to the inside of the corresponding work booth 2 through the entrance and exit. In the facility 8, the areas inside the multiple work booths 2 have the same grade of cleanliness as the area that is outside the multiple work booths 2 but is inside the clean room 1.

Therefore, while an article is manufactured in at least one of the multiple work booths 2, other work (for example, the process simulation test) can be concurrently performed in parallel in any other work booth 2 that is not being used for manufacturing the article. Furthermore, even if contamination occurs in a work booth 2 other than the work booth 2 used for manufacturing the article, contamination in the work booth 2 where the article is manufactured can be prevented.

Figure 2:
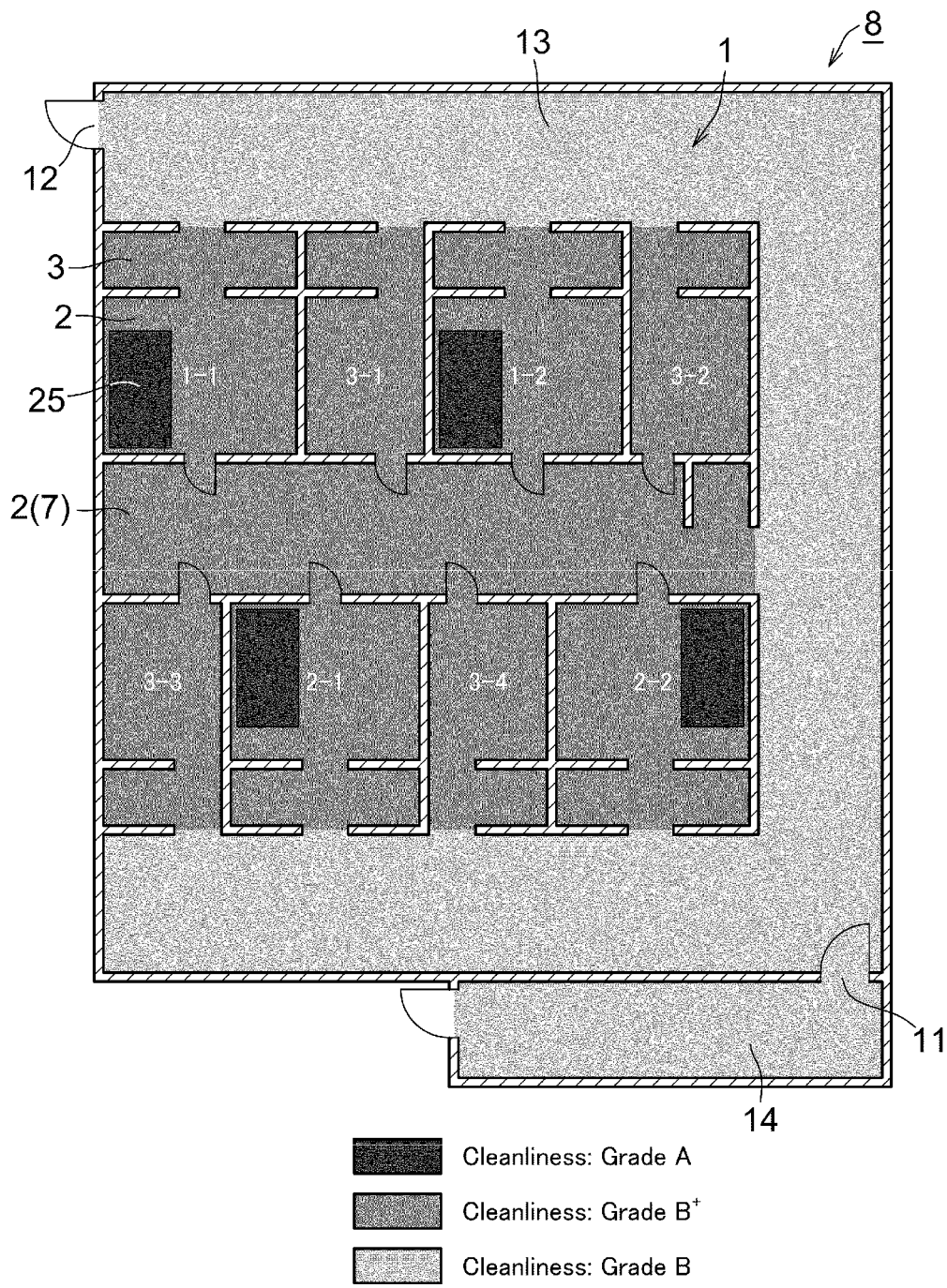
FIG. 2 is a sketch showing the levels of cleanliness of the facility according to the embodiment of the present invention.

In addition, as shown in FIG. 2, the areas inside the work booths 2 have the same grade of cleanliness (grade B in this embodiment) as the area that is outside the work booths 2 but is inside the clean room 1. Therefore, when workers enter or exit a work booth 2 or move between work booths 2, the workers do not need to change their clothes according to the level of cleanliness and can perform work efficiently.

"Other work" as referred to herein means work that is different from the manufacturing of an article conducted by using a work booth 2. Examples of "other work" include the process simulation test performed before manufacturing the intended article, maintenance of instruments installed in another work booth, and education and training of personnel involved in the manufacture of the article. Examples of instruments installed in the work booth 2 include centrifuges, biosafety cabinets 25, air inflow devices 61 as described below, and the like.

First, the details of the facility 8 used in the manufacturing implementation method according to this embodiment are explained below and then the implementation method for manufacturing an article is explained.

(1.2) Facility

The facility 8 is for manufacturing an article and performing other work (e.g., the process simulation test). As shown in FIG. 1, the facility 8 comprises a clean room 1; multiple work booths 2 provided in the clean room 1 (nine work booths in this embodiment); and barrier sections corresponding, one-to-one, to the work booths 2 and provided in the clean room 1. As stated above, the barrier sections are provided along entrances and exits of the work booths 2 and function to prevent airflow from the outside to the inside of the work booths 2 through the entrances and exits. According to this embodiment, each barrier section is composed of a support booth 3. The clean room 1 comprises, in addition to the work booths 2 and the support booths 3, a passage 13 that is adjacent to the support booths 3.

(1.2.1) Clean Room

Clean room 1 is a room in which the air in the room is maintained at a specific level of cleanliness. The clean room 1 is composed of one room in a building and its perimeter is surrounded by internal walls or partitions. The clean room 1 also comprises one or more entrances 11 and exits 12, specifically one entrance 11 and one exit 12. Outside the clean room 1, a changing room 14 is provided at a location that leads to the entrance 11. The changing room 14 is a room for workers to change their clothes when they move between the clean room 1 and the outside of the clean room 1. The level of cleanliness inside the clean room 1 is set to "grade B" as described below, whereas the level of cleanliness outside the clean room 1 is set to "grade C." Therefore, when workers move between spaces with different cleanliness levels, the workers need to change their clothes in the changing room 14.

FIG. 2 shows cleanliness areas in the facility 8. The grades of cleanliness shown in FIG. 2 are defined by using the maximum permitted number of airborne particles and the number of environmental microorganisms, as shown in Tables 1 and 2 below. In the facility 8 according to this embodiment, the areas the inside of the work booths 2 and the areas that are outside the work booths 2 but are inside the clean room 1 (a passage 13 and support booths 3 in this embodiment) are set to have the same level of cleanliness, grade B, as the zone that is outside the work booths 2 but is inside the clean room 1 (a passage 13 and support booths 3 in this embodiment). Among the levels of grade B, grade B and grade B$^+$ may be distinguished from each other in according to the monitoring frequency. In this embodiment, the passage 13 is set to grade B, whereas the work booths 2 and the support booths 3 are set to grade B$^+$. Further, biosafety cabinets 25 (BSC; biosafety cabinets) in the work booths 2 where the article is handled are set to grade A.

In the present invention, areas that have a level of cleanliness of grade B (including grade B$^+$) may be referred to "cleanliness-controlled areas," whereas areas that have a level of cleanliness of grade A may be referred to as "aseptic processing areas." The cleanliness of the passage 13, work booths 2, and support booths 3 in the clean room 1 is controlled in this way according to the nature of the work, thereby preventing contamination of the clean room due to floating particulates and microorganisms from the outside.

The "cleanliness-controlled area" as referred to herein indicates one or more locations in the areas where work is preformed, which are a location where an article is manufactured and a location where containers etc. before sterilization come into contact with the air in the facility 8. The "aseptic processing area" as referred to herein indicates one or more locations in the areas where work is preformed, which are a location where an article that needs to be handled by aseptic processing is prepared, a location where sterilized containers, etc. come into contact with the air in the facility 8, and a location where aseptic processing, such as a sterility test, is performed.

TABLE 1

| | | The maximum permitted number of airborne particles (particles/m³) | | | | |
|---|---|---|---|---|---|---|
| | | At rest | | In operation | | Supplementary |
| | | ≥0.5 μm | ≥5 μm | ≥0.5 μm | ≥5 μm | note |
| Grade A | Aseptic processing area | 3520 | 20 | 3520 | 20 | |
| Grade B$^+$ | Cleanliness-controlled area | 3520 | 29 | 352000 | 2900 | High monitoring frequency |
| Grade B | | 3520 | 29 | 352000 | 2900 | |
| Grade C | | 352000 | 2900 | 3520000 | 29000 | |

TABLE 2

| | Airborne microorganisms | | Microorganisms on the surface | |
|---|---|---|---|---|
| | Floating microorganisms (CFU/m³) | Falling micro-organism (CFU/4 hours) | Instruments, walls, etc. (CFU/ 24-30 cm²) | Gloves (CFU/5 fingers) |
| Grade A | <1 | <1 | <1 | <1 |
| Grade B | 10 | 5 | 5 | 5 |
| Grade C | 100 | 50 | 25 | — |

(1.2.2) Work Booth

Work booths 2 are provided in the clean room 1 and are mainly used to manufacture an article. Each work booth 2 means one space formed by partitioning in the room. Although the work booths 2 are mainly used to manufacture an article, when work booths 2 are not used to manufacture an article, the process simulation test and/or maintenance of instruments and/or education and training of workers may be conducted in the work booths 2.

As shown in FIG. 1, the facility 8 according to this embodiment comprises nine work booths 2 as multiple booths 2. Among the nine work booths 2, four work booths 2 (which are referred to as a "first group of work booths") are aligned in the first direction, and work booths 2 that are next to each other are adjacent to each other. Further, in the direction perpendicular to the first group of work booths (the second direction), four work booths 2 (which are referred to as a "second group of work booths") are disposed through one work booth 2 (which may be referred to as a "delivery area 7"). The four work booths 2, which are the second group of work booths, are arranged in the first direction, and the work booths 2 that are next to each other are adjacent to each other. Accordingly, the delivery area 7 is accessible to all work booths 2 other than itself. The term "access" as referred to herein means that a material for use in manufacturing of an article can be received therefrom or given thereto.

In each of the work booths 2, instruments used to manufacture an article are provided. Examples of the instruments include work tables (not shown), centrifuges (not shown), biohazard safety cabinets 25, and the like. In this embodiment, as stated above, the inside of the work booths 2 is a "cleanliness-controlled area", whereas the inside of the biohazard safety cabinets 25 is an "aseptic processing area." The aseptic processing area, which is one of the levels of cleanliness, does not have to be only the inside of the biohazard safety cabinets 25 but may also include, in addition to the inside of the biohazard safety cabinets 25, for example, the top surface of work tables.

Figure 3:
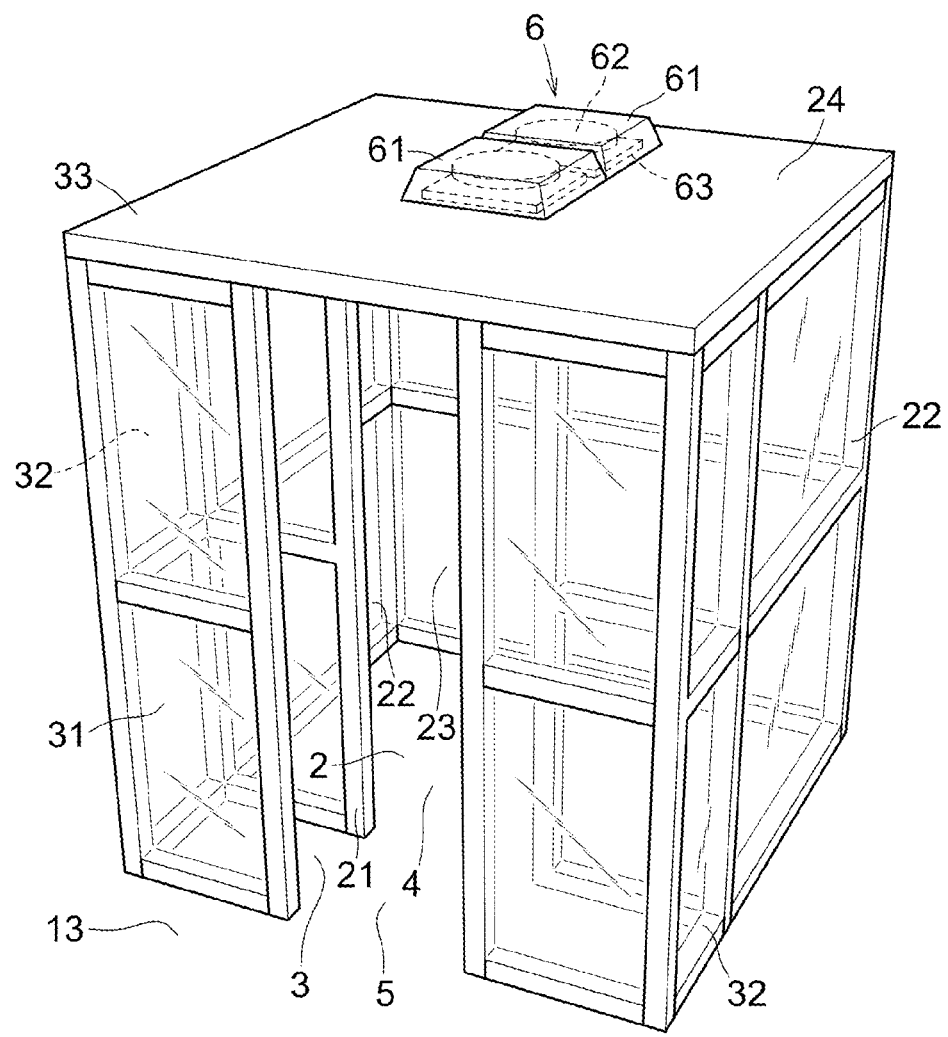
FIG. 3 is a perspective view of work booths and support booths of the facility according to the embodiment of the present invention.

FIG. 3 is a schematic perspective view of a work booth 2 and a support booth 3. In FIG. 3, for the sake of explanation convenience, only one work booth 2 and one support booth 3 are shown. However, in fact, multiple work booths 2 are arranged as shown in FIG. 1.

As shown in FIG. 3, the work booth 2 is partitioned by a front wall 21 (an intermediate wall), a pair of side walls 22, a rear wall 23, and a top wall (top plate) 24 formed at the upper end of these walls. As a positive pressure generator 6, multiple air inflow devices 61 are attached to the top wall 24. The air inflow devices 61 introduce air from the inside of the clean room 1 into the work booth 2, whereby the inside of the work booth 2 can be maintained at a positive pressure relative to the passage 13. The positive pressure generator 6 is described in detail below in "(1.2.5) Positive Pressure Generator."

In the present invention, each work booth 2 is kept at a positive pressure to thereby form airflow toward the corresponding support booth 3 through an entrance and exit (a first opening 4) formed in the front wall 21 and form airflow toward the passage 13 through an entrance and exit (a second opening 5) of the support booth 3 that faces the passage 13. With this configuration, airflow from the outside of the work booth 2 into the work booth 2 through the entrance and exit (the first opening 4) can be prevented without closing the entrance and exit. That is, in this embodiment, the support booth 3 constitutes a barrier section.

Each support booth 3 prevents, for example, viruses, bacteria, fungi, microorganisms, etc. (which are referred to below as "microorganisms etc.") from entering the corresponding work booth 2 from the space in the clean room 1 (a passage 13 in this embodiment). Multiple support booths 3 are provided adjacent to the multiple work booths 2 on a one-to-one basis.

(1.2.3) Passage

The passage 13 is an area that connects an entrance and exit of the clean room 1 and an entrance and exit of each support booth 3 (second opening 5) and through which workers pass. The passage 13 is a space that is part of the clean room 1. The passage 13 faces second openings 5 of the support booths 3. The passage 13 is set as a cleanliness-controlled area (grade B), as shown in FIG. 2.

(1.2.4) Barrier Section

A barrier section is provided along the entrance and exit (first opening 4) of each work booth 2 and functions to prevent airflow from the outside of the work booth 2 to the inside of the work booth 2 through the entrance and exit (first opening 4). The barrier section according to this embodiment is a support booth 3 as described above. The support booth 3 is provided between each work booth 2 and the passage 13. In the support booth 3, the air flows from inside of the work booth 2 through the entrance and exit (first opening 4) of the work booth 2 towards the passage 13. This prevents airflow from outside the work booth 2 toward the inside through the entrance and exit (first opening 4). As a result, this prevents microorganisms etc. from entering the work booth 2 on the airflow. In this embodiment, the function of preventing microorganisms etc. from entering the work booth 2 is referred to as a "barrier function."

In the present invention, the barrier function of the barrier section is achieved, for example, by maintaining each work booth 2 at a positive pressure relative to the passage 13. Alternatively, this function can also be achieved by creating airflow from each support booth 3 toward the passage 13. The barrier section may be configured to be formed by a door with which the entrance and exit of the work booth 2 is closed, or may be configured to be formed by an air curtain flowing along the entrance and exit of the work booth 2.

The support booth 3 has the same level of cleanliness as that of the space within the clean room 1 (the passage 13 in this embodiment) and is a cleanliness-controlled area as shown in FIG. 2. However, in this embodiment, the support booth 3 is monitored more frequently than the passage 13 and its level of cleanliness is set to grade B+.

As shown in FIG. 3, the support booth 3 is formed by being partitioned by a front wall 21 disposed between the work booth 2 and the support booth 3, an opposing wall 31 disposed spaced apart in the forward direction relative to the front wall 21, a pair of side walls 32, and a top wall 33. In this embodiment, the top wall 33 and the top wall 24 are one piece, but may be separately formed. The adjacent side walls 22, 32 are separately formed but may be one piece.

As shown in FIG. 1, the facility 8 comprises a first opening 4 through which a support booth 3 and a work booth 2 corresponding to the support booth 3 communicate with each other (i.e., an entrance and exit of the work booth 2), and a second opening 5 through which the support booth 3 and the passage 13 communicate with each other (i.e., an entrance and exit facing the passage 13).

The first opening 4 is formed by penetrating the front wall 21. The first opening 4 is formed large enough to allow a person to pass through. The first opening 4 according to this embodiment does not have a door and is always open. Alternatively, in the present invention, the first opening 4 may be configured to be opened and closed with a door and can be closed with the door. The first opening 4 may be formed at the center of the front wall 21 in the width direction, or at an end portion of the front wall 21 in the width direction, or somewhere between the end portion and the center of the front wall 21 in the width direction.

The second opening 5 is formed by penetrating the opposing wall 31. The second opening 5 is formed large enough to allow a person to pass through. The second opening 5 does not have a door and is always open. Alternatively, the second opening 5, as well as the first opening 4, may be configured to be opened and closed with a door and can be closed with the door. The second opening 5 is formed at a position that overlaps with the first opening 4 when viewed from a direction perpendicular to the opening surface. The term "overlap" referred to herein means that at least part overlaps. The first opening 4 may overlap with the second opening 5 entirely or partially.

In the present invention, the position of the second opening 5 does not have to overlap with the first opening 4. The second opening 5 may be formed at the center of the opposing wall 31 in the width direction; at an end portion of the opposing wall 31 in the width direction; somewhere between the end portion and center of the opposing wall 31 in the width direction; or in the side walls 22, 32.

The second opening 5 communicates with the first opening 4. The opening area of the second opening 5 is smaller than that of the first opening 4. Therefore, since each work booth 2 is kept in a positive pressure state by the positive pressure generator 6, the air that has flown into the corresponding support booth 3 through the first opening 4 creates airflow into a space inside the clean room 1 through the second opening 5.

By providing the work booth 2 maintained at a positive pressure relative to the passage 13 in this manner, the support booth 3 functions as a barrier section and can more effectively prevent microorganisms etc. from entering the work booth 2 through the passage 13. Furthermore, changes in atmospheric pressure (disturbances) that occur when a worker passes through the passage 13 can be suppressed from affecting the cleanliness inside the work booth 2.

(1.2.5) Positive Pressure Generator

The positive pressure generator 6 maintains each work booth 2 at a positive pressure. This creates airflow that flows out of the work booth 2 through the first opening 4 and can generate airflow that flows from the inside of the support booth 3 toward the passage 13 through the second opening 5.

In this embodiment, as shown in FIG. 3, the air in the clean room 1 is introduced into the work booth 2 by means of multiple (two in this embodiment) air inflow devices 61 to make the inside of the work booth 2 at a positive pressure. The air inflow devices 61 are mounted on the top wall 24 facing the work booth 2. When the work booth 2 is at a positive pressure, the air in the work booth 2 flows into the support booth 3 through the first opening 4, thus making the inside of the support booth 3 at a positive pressure. Accordingly, the positive pressure generators 6 create airflow from inside the support booth 3 toward the outside through the second opening 5 to the passage 13.

Each air inflow device 61 is mounted in an installation hole (not shown) that penetrates through the top wall 24. The air inflow device 61 comprises a fan 62 for intake of air from the clean room 1 into the work booth 2 through an air inlet, and a filter 63. The filter 63 is provided in a flow channel through which the airflow formed by the fan 62 flows. The filter 63 prevents microorganisms etc. floating in the space and foreign matter, such as lint and dust, from passing therethrough. Examples of the filter 63 include medium performance filters, electrically charged filters, HEPA filters (high-efficiency particulate air filter), ULPA filters (ultra-low-penetration air filter), and the like. From the standpoint of performance and costs, HEPA filters are preferred. In this embodiment, the positive pressure generator 6 comprises two air inflow devices 61. Alternatively, in the present invention, the number of the air inflow device 61 may be one or three or more.

When the work booth 2 is maintained at a positive pressure by the positive pressure generator 6, airflow from the work booth 2 toward the space inside the clean room 1 through the first opening 4, the corresponding support booth 3, and the second opening 5 is generated. This forms a barrier section along the entrance and exit of the work booth 2 and thereby effectively prevents microorganisms etc. from entering the work booth 2 and more effectively suppresses the effects of disturbances that occur when a worker passes through the passage 13 from being transmitted into the work booth 2. As a result, contamination in the work booth 2 can be prevented.

Air inlets are provided at several locations that face the passage 13, as shown in FIG. 1. Each air inlet and the air inflow device 61 communicate with each other via an air flow passage (e.g., a duct). Multiple air inlets are provided spaced apart from each other along the passage 13. Air in the passage 13 is sucked into the air inlets to thereby create an airflow in the passage 13, whereby a flow along the passage 13 is generated in the passage 13. The air taken in from the multiple air inlets is supplied to the work booth 2 through the duct and the filter 63 and goes out from the second opening 5 to the passage 13.

Thus, the air flowing in the passage 13 repeatedly circulates while passing through the filter 63. The clean room 1 is provided with a plurality of differential pressure dampers to adjust the pressure in the passage 13. Therefore, in conventional clean rooms 1, there is a possibility that microorganisms etc. that could cause contamination may leak out of the clean room 1 through the differential pressure dampers. In contrast, in the facility 8 according to this embodiment, the air that flows through the passage 13 is taken in through the air inlets facing the passage 13 and repeatedly circulates while passing through the filter 63. Therefore, even if contamination occurs in the passage 13 or in one of the work booths 2, microorganisms etc. that cause contamination are significantly prevented from escaping from the differential pressure dampers. As a result, cross-contamination to other adjacent clean rooms and/or spread of contamination to the environment can be inhibited.

(1.3) Implementation Method for Manufacturing Article

Figure 4:
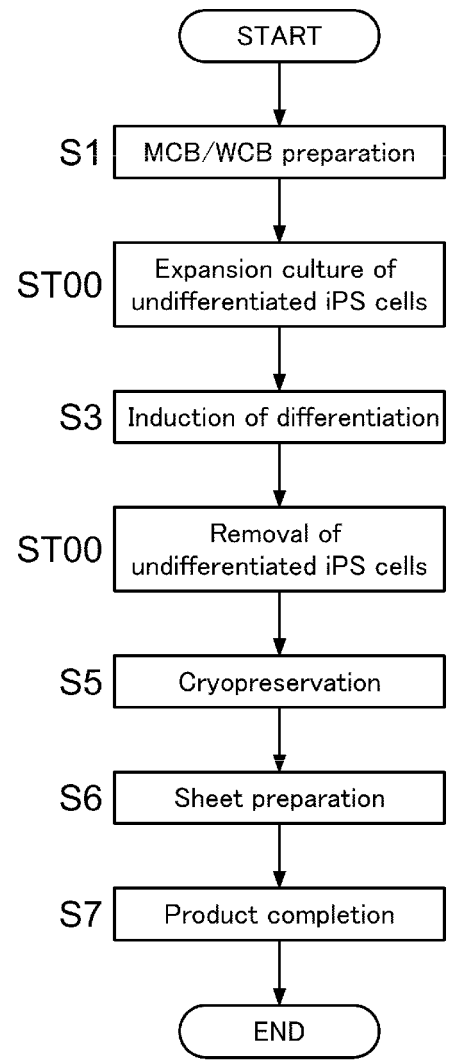
FIG. 4 is a flowchart of a method for manufacturing an article according to the embodiment of the present invention.

The manufacture of an article is carried out by using the facility 8 configured as described above. As shown in FIG. 4, the manufacture of a product is finally completed in S7 after going through the following steps:
 a first step S1 of preparing a master cell bank (MCB) and/or a working cell bank (WCB);
 a second step S2 of performing expanded culture of undifferentiated iPS cells;
 a third step S3 of inducing differentiation;
 a fourth step S4 of removing undifferentiated iPS cells;
 a fifth step S5 of preservation by freezing; and
 a sixth step S6 of producing a patch.

FIG. 5 shows work booths 2 that are assigned to each step in manufacturing an article are indicated in black. The "work booth" numbering in FIG. 5 corresponds to the numbering of the work booths 2 in FIG. 1. As can be also seen from FIG. 5, several work booths 2 are not in use during the manufacture of an article.

Accordingly, in the manufacturing implementation method according to this embodiment, the work booth 2, which is not being used in the manufacture of an article, is used to perform the process simulation test (described as "PST" in FIG. 5). For example, the first step S1 and the second step S2 are performed in a work booth 2 numbered 1-1 for a period of approximately 4 to 7 weeks, during which process simulation tests are concurrently performed in work booths 2 numbered 1-2, 2-1, 2-2, 3-1, 3-2, 3-3, and 3-4. Further, the third step S3 and the fourth step S4 are performed in work booths 2 numbered 1-1, 1-2, 2-1, 2-2, 3-1, 3-2, and 3-3 for a period of approximately 4 weeks, during which the process simulation test is concurrently performed in a work booth 2 numbered 3-4.

More specifically, in the implementation method for manufacturing an article according to this embodiment, an article is manufactured in at least one of the multiple work booths 2, whereas the process simulation test is performed in at least one other work booth 2 that is different from the work booth 2 used to manufacture the article.

Since the process simulation test can be thereby performed in a work booth 2 that is not being used, the number of work booths 2 that are not in use can be reduced as much as possible, and space can be more efficiently used. Therefore, the manufacturing implementation method according to this embodiment does not require a large facility 8 when the manufacture of an article and the process simulation test are both performed.

In the sixth step S6, an important intermediate is thawed and patches are produced in response to an order from a hospital or other institutions (approximately 3 days). When there are no orders, this period is a break period during which the manufacture of an article is not performed in the work booth 2. Since the sixth step S6 is an order-basis step, the period during which the sixth step S6 is to be performed can be treated as a period during which no work booths 2 for manufacturing an article are present, and the process simulation test can be conducted in any of the work booths 2. The "important intermediate" as referred to herein means cardiomyocytes produced from iPS cells over a period of about two and a half months and cryopreserved.

(2) Variations

The above embodiment is only one of the various embodiments of the present invention. Embodiments can be modified in various ways depending on the design etc. as long as the object of the present invention can be achieved. Variations of the embodiments are described below. The variations described below can be applied in combination as appropriate.

In the above embodiment, for the sake of explanation convenience, the portion other than the work booths 2 in the clean room 1 is referred to as "passage 13." However, the clean room 1 including the space corresponding to passage 13 in the clean room 1 is a clean room 1 as a "work room" and the portion other than the work booths 2 in the clean room 1 can also be used as a space for culturing.

The clean room 1 according to this embodiment is a "biological clean room." Alternatively, in the present invention, this room can be an industrial clean room.

In the above embodiment, the first opening 4 and the second opening 5 are always open. Alternatively, in the present invention, the first opening 4 and the second opening 5 may be configured to be opened and closed with the door and can be closed with a door.

In the above embodiment, while grade $B^+$ and grade B are the same in definitions using the maximum permitted number of airborne particles and the number of environmental microorganisms, "grade $B^+$" and "grade B" are distinguished in monitoring frequency. Alternatively, grade $B^+$ and grade B can be distinguished in terms of the maximum permitted number of airborne particles or the number of environmental microorganisms. On the other hand, grade $B^+$ and grade B can be treated as the same level of cleanliness (grade B) without distinction.

(3) Recapitulation

As explained above, the facility according to a first aspect comprises:
a clean room 1;
multiple work booths provided in the clean room 1 and each comprising an entrance and exit;
barrier sections provided along the entrances and exits of the corresponding multiple work booths 2 and configured to prevent airflow from the outside to the inside through the entrances and exits of the work booths. The area inside each of the multiple work booths 2 has the same grade of cleanliness as the area that is outside the multiple work booths 2 but is inside the clean room 1.

According to this aspect, while an article is manufactured in at least one of the multiple work booths 2, other work can be concurrently performed in any of the other work booths 2 that are not being used to manufacture the article. Further, even if contamination occurs in one of the other work booths 2, contamination in the work booth 2 where the article is manufactured can be prevented. Furthermore, the area inside each work booth 2 has the same level of cleanliness as the area that is outside the work booths 2 but is inside the clean room 1. Therefore, when a worker enters or exits a work booth 2 or moves between work booths 2, the worker does not need to change clothes according to the grade of cleanliness and can efficiently perform work.

Furthermore, since the barrier sections are provided, even if contamination occurs in the clean room 1 during the maintenance of other work booths 2 or due to trouble with the air-conditioning system for air conditioning inside the clean room 1, the barrier function by the barrier sections can maintain the cleanliness of the work booth 2 where the article is manufactured. Further, if training of workers who manufacture an article is conducted in a work booth 2 that is different from the work booth 2 where the article is manufactured, this can be a contamination risk to the clean room 1. However, the cleanliness of the work booth 2 where the article is manufactured can be maintained by the barrier sections.

In the facility 8 according to a second aspect, the area inside each of the multiple work booths 2 and the area that is outside the multiple work booths 2 but is inside the clean room 1 are cleanliness-controlled areas.

According to this aspect, the space in the work booth 2 where the article is manufactured can be efficiently maintained at a high level of cleanliness. More specifically, since areas where higher levels of cleanliness are required are locally partitioned by work booths 2, a high level of cleanliness can be efficiently maintained in sections required to have a high level of cleanliness, for example, by supplying clean air to the clean room 1 through the work booths 2, as compared to the case in which the entire clean room 1 is kept at a high level of cleanliness.

In the first or second aspect, the facility 8 according to a third aspect comprises an aseptic processing area in at least one of the multiple work booths 2.

According to this aspect, the space in which the article is manufactured can be kept sterile.

In any one of the first to third aspects, the facility 8 according to a fourth aspect comprises barrier sections each configured to prevent airflow from the outside to the inside through the entrance and exit of the corresponding work booth 2 without closing the entrance and exit of the work booth 2.

With this configuration, workers can easily enter and exit a work booth 2 or move between the work booths 2 and can efficiently perform work.

In any one of the first to the fourth aspects, the facility 8 according to a fifth aspect comprises the multiple work booths 2 each comprising a pair of side walls 22, a rear wall 23 provided at the rear end of the pair of side walls 22, a front wall 21 provided at the front end of the pair of side walls 22 and comprising an entrance and exit, and a top wall 24 provided at the top ends of the pair of side walls 22, the rear wall 23, and the front wall 21.

According to this aspect, since the area having a high level of cleanliness is surrounded by work booths 2, it is easy to locally maintain the space for manufacturing an article at a high level of cleanliness.

In the fifth aspect, the facility according to a sixth aspect comprises the multiple work booths 2 each comprising a positive pressure generator 61 for maintaining the inside of the work booth 2 at a positive pressure. The positive pressure generator 6 comprises at least one air inflow device mounted on the top wall 24 to introduce air from the clean room 1 into the inside of the work booth 2.

According to this aspect, even if contamination occurs in the clean room 1, it is possible to prevent contaminants from flowing into the work booths 2.

In the sixth aspect, the facility 8 according to a seventh aspect comprises the air inflow device 61 that comprises a filter 63 through which air introduced into the work booth 2 passes.

According to this aspect, the cleanliness of the clean room 1 can be always maintained at a high level. Therefore, even if contamination occurs in one of the work booths 2, the contamination is prevented from spreading in the clean room 1.

In the seventh aspect, the facility 8 according to an eighth aspect further comprises a passage 13 that connects the multiple work booths 2. The air inflow device 61 introduces the air taken in from an air inlet facing the passage 13 into the inside of the work booth 2 through the filter 63.

According to this aspect, even if contamination occurs in a work booth 2 and/or the passage 13, the contaminated air can be passed through a filter 63 and then introduced into the work booth 2. Therefore, the contamination can be prevented from leaking out of the clean room 1.

The implementation method for manufacturing an article according to a ninth aspect is performed by using the facility of any one of the first to the eighth aspects. The implementation method for manufacturing an article comprises manufacturing an article in at least one of the multiple work booths 2, while other work that is different from the manufacture of the article is performed in one of the multiple work booths 2 that are different from the work booth 2 where the manufacture of an article is performed.

According to this aspect, since other work, such as a process simulation test, can be performed by using a work booth 2 that is not being used, the number of work booths 2 that are not in use can be reduced as much as possible and the space can be used more efficiently. As a result, when manufacturing of an article and the process simulation test are both performed, a large facility 8 is not required.

In the ninth aspect, the implementation method for manufacturing an article according to a tenth aspect comprises performing the other work that is the process simulation test to confirm whether sterility in manufacturing of an article is appropriate, maintenance of instruments installed in another work booth, or education and training of personnel involved in the manufacture of an article.

In the ninth or tenth aspect, the implementation method for manufacturing an article according to an eleventh aspect comprises manufacturing an article that includes a cellular and tissue-based product.

According to this aspect, when a cellular and tissue-based product is to be manufactured, manufacturing of an article and the process simulation test can be both performed in one clean room 1, without requiring a large facility 8.

The configurations according to the second to seventh aspects are not essential in the facility of the present invention and can be omitted as appropriate.

EXPLANATION OF REFERENCE NUMERALS

1: Clean room
13: Passage
2: Work Booth
21: Front wall
22: Side wall
23: Rear wall
24: Top wall
6: Positive pressure generator
61: Air inflow device
63: Filter
8: Facility

The invention claimed is:
1. A facility comprising
a clean room;
multiple work booths provided in the clean room, each work booth comprising a first opening and further comprising a positive pressure generator for maintaining an inside of the work booth at a positive pressure;
multiple support booths corresponding, one-to-one, to the multiple work booths and provided adjacent to the work booths, each support booth comprising a second opening that communicates with the first opening and that is configured to allow air flowing from the corresponding work booth into the support booth through the first opening to flow out through the second opening and thereby prevent airflow from an outside of the work booth toward the inside thereof, thus having a barrier function; and
a passage provided in the clean room and facing the second opening of each of the multiple support booths;
wherein areas inside the multiple work booths have a same grade of cleanliness as the support booths and the passage.

2. The facility according to claim 1, wherein the areas inside the multiple work booths, the support booths, and the passage are cleanliness-controlled areas.

3. The facility according to claim 1, wherein at least one of the multiple work booths has an aseptic processing area inside.

4. The facility according to claim 1, wherein the multiple work booths each comprise:
a pair of side walls;
a rear wall provided at rear ends of the pair of side walls;
a front wall provided at front ends of the pair of side walls and comprising an entrance and an exit; and a top wall provided at upper ends of the pair of side walls, the rear wall, and the front wall.

5. The facility according to claim 4, wherein the multiple work booths each comprise the positive pressure generator that maintains the inside of the corresponding work booth at a positive pressure, and wherein the positive pressure generator comprises at least one air inflow device mounted on the top wall and configured to introduce air in the clean room into the corresponding work booth.

6. The facility according to claim 5, wherein the air inflow device comprises a filter through which air to be introduced into the corresponding work booth passes.

7. The facility according to claim 6, wherein the air inflow device is configured to introduce air taken in from an air inlet facing the passage into the corresponding work booth through the filter.

8. A method of using the facility of claim 1, comprising performing a manufacture of an article in at least one of the multiple work booths and performing other work that is different from the manufacture of the article in a work booth other than the work booth in which the manufacture of the article is performed.

9. The method of using the facility according to claim 8, wherein said other work is a process simulation test to confirm whether sterility in manufacturing an article is appropriate, maintenance of instruments installed in said another work booth, or education and training of a worker involved in the manufacture of the article.

10. The method of using the facility according to claim 8, wherein the article includes a cellular and a tissue-based product.

* * * * *